United States Patent [19]
Rubi

[11] 4,226,386
[45] Oct. 7, 1980

[54] TAPE RECORDING/REPRODUCING TRANSPORT SYSTEM, PARTICULARLY FOR LONGITUDINAL VIDEO TAPE RECORDING

[75] Inventor: Horst Rubi, Hildesheim, Fed. Rep. of Germany

[73] Assignee: Blaupunkt-Werke GmbH, Hildesheim, Fed. Rep. of Germany

[21] Appl. No.: 50,319

[22] Filed: Jun. 20, 1979

[30] Foreign Application Priority Data

Jul. 1, 1978 [DE] Fed. Rep. of Germany ....... 2829047

[51] Int. Cl.³ .......................... G03B 1/04; G11B 15/32
[52] U.S. Cl. ..................................... 242/192; 242/210
[58] Field of Search ....................... 242/192, 210, 67.5

[56] References Cited

U.S. PATENT DOCUMENTS 3,370,804  2/1968  Peyton .................................. 242/192

Primary Examiner—Leonard D. Christian
Attorney, Agent, or Firm—Frishauf, Holtz, Goodman & Woodward

[57] ABSTRACT

To reduce the engagement force in a tape transport mechanism between the drive roller and the pay-out storage winding, the pay-out storage winding and the take-up storage winding are connected by a friction arrangement and by a spring, the spring providing essentially equal forces of engagement between the respective storage windings and the drive roller, the friction force generating elements and the spring being so arranged relative to each other that the friction forces tend to be subtractive with respect to the spring forces at the pay-out winding and additive at the take-up winding.

9 Claims, 1 Drawing Figure

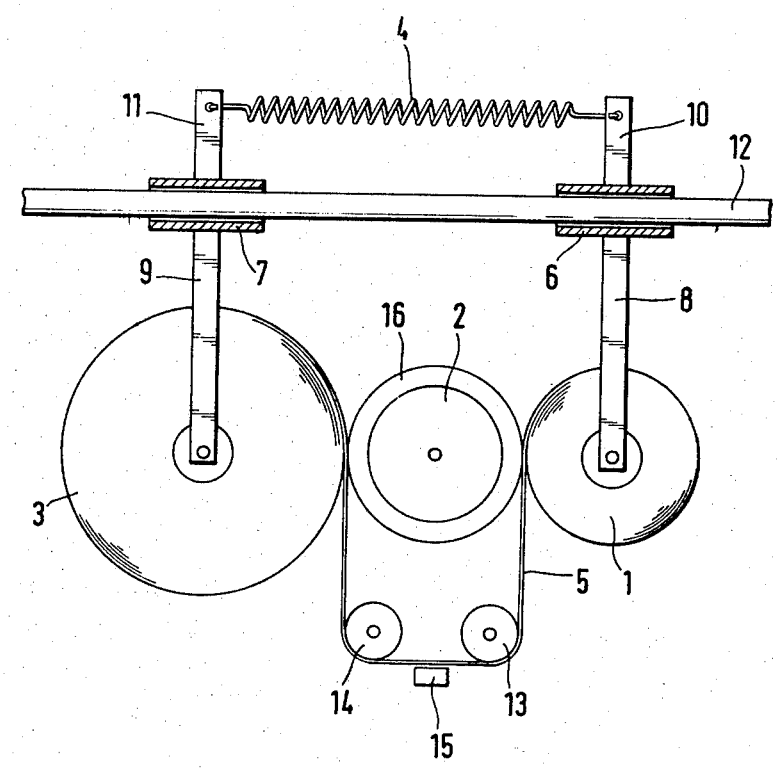

TAPE RECORDING/REPRODUCING TRANSPORT SYSTEM, PARTICULARLY FOR LONGITUDINAL VIDEO TAPE RECORDING

The present invention relates to tape recording/reproducing apparatus—hereinafter, for short, "tape transducing apparatus"—and more particularly to transport mechanisms therefor, and especially suitable for use with video tape recording apparatus in which the video signals are longitudinally recorded on the tape.

BACKGROUND AND PRIOR ART

Tape transducing apparatus requires a drive for the tape transport. The tape itself should be driven at a uniform speed past a magnetic transducing head. In one such system, a drive roller is used, which is in engagement with the take-up storage winding and with the pay-out storage winding. In use, the take-up storage winding will increase in diameter as the pay-out storage winding decreases in diameter, so that the overall spacing between a pair of parallel positioned reels, holding the windings, can remain essentially constant, although the position of the free distance of the tape between the two windings shifts laterally between the axes of rotation of the windings. It is necessary to maintain tension on the tape being moved past the transducing head. Some drag force is therefore usually applied to pay-out winding or reel holding the winding. The drag force has to be overcome by the torque of the wind-up mechanism, applied to the take-up winding. If the mechanism driving the take-up winding is in the form of a friction wheel which is in engagement with the winding loops themselves, it is necessary to permit change of position of the respective axes of rotation of the storage windings and of the drive roller.

German Patent Publication De-AS No. 23 50 816 discloses a transport arrangement in which an additional force by means of a biassing spring is applied to the bearing of the take-up winding to provide for reliable operation thereof. The additional force applied by the biassing spring presses the take-up winding into engagement with the drive roller. The pay-out winding itself has no additional force applied thereto.

Application of an additional force to the take-up winding causes additional friction losses which have to be overcome by the torque of the drive unit.

THE INVENTION

It is an object to provide a transport arrangement for tape transducer systems in which frictional losses are decreased.

Briefly, a biassing spring is provided to engage both the pay-out as well as the take-up storage windings with a drive roller or capstan which is located between the storage windings. In accordance with the invention, the spring force is modified in such a way that, at the pay-out winding, the force is reduced by applying a counteracting force thereto. The reduction of this engagement force, caused by the spring, can be compensated at the take-up reel or winding, so that proper tension of the tape between the pay-out and take-up storage windings is maintained.

In accordance with a simple and efficient embodiment of the invention, the transport arrangement includes a parallel shiftable support for the shafts of the take-up storage winding as well as for the pay-out storage winding, which can shift laterally along a guide rod or guide rail or track, the spring force being provided by a tension spring applied between the respective shiftable or movable bearing supports. In a preferred form, the support elements for the bearings of the respective storage windings are links or levers which are independently secured to bearings which slide on the guide rod or track, the spring being located at a portion of the lever arms or links remote from the portion at which the bearings are located, that is, at the other side of the guide rod or track. Tilting, due to the spring, resulting in a tilting torque and effective between the sliding bearings of the guide rod or track modifies the force applied by the spring on the links or levers and hence the frictional engagement force of the respective windings with the drive roller or capstan.

The system has the advantage that the proper tension for the transducing tape is ensured without requiring additional substantial components or modifications of tape transport systems since the elements used by the system in accordance with the present invention are usually present already anyway. The system is also suitable for use with reversely operating or reversely spooling transport arrangements since the direction of movement of the tape, that is, which one of the storage windings is the pay-out winding and the take-up winding, respectively, is not material and the respective forces applied to the winding which maintain the tension of the tape automatically are applied in the proper direction since the tilting and friction forces which add to, or subtract from the tension applied by the spring arise upon movement of the supports for the bearings of the respective windings towards and away from the drive roller as the diameters of the respective windings change in operation. No additional reversal mechanisms are necessary.

DRAWINGS

Illustrating a preferred example, wherein the sole FIGURE is a schematic top view of a tape transport system in which those elements not necessary for an understanding of the present invention have been omitted.

A take-up storage winding 1 and pay-out storage winding 3 are located on suitable supports. The two storage windings 1, 3 are biassed towards each other by a spring 4. The storage windings, that is, the tape thereon, is pressed against an elastic friction surface 16 on a drive roller or capstan 2. The take-up winding 1 is supported for rotation on a lever which has a first lever arm 8 and a second lever arm 10, between which a slide bearing 6 is interposed, sliding on a guide rod or track 12. The pay-out storage winding 3 is supported on a similar lever having arms 9, 11, and guided on the rod 12 by bearing 7. Since the direction of movement of the tape 5 can be in either direction—not only in accordance with the arrow as shown in the FIGURE, but with reverse thereto—the characterization of the respective reels 1, 3 as "take-up" and "pay-out" reels is arbitrary and selected to facilitate an understanding of the present invention and the operation of the system. Of course, the respective position of take-up and pay-out reels can be reversed, that is, the tape can move in the reverse direction.

The tension spring 4 is hooked into the lever portions 10, 11 to urge the levers 8-10 and 9-11 towards each other, so that the circumference of the respective windings 1, 3 will be in engagement with the drive roller 2.

The spring 4 is located at those portions of the lever arms which are remote from the drive roller, that is, at the other side of the guide rod or track 12.

The two lever arms 8–10 and 9–11 have the same length and are parallel to each other; they are guided to extend perpendicularly with respect to the rod or track 12, and hence to be perpendicular with respect to their slide bearings 6, 7. The tape is guided from the respective winding which forms the pay-out winding, in engagement with the roller 2 to a pair of guide and deflection rollers 14, 13 and then to the take-up winding 1. A magnetic transducer head 15 is located between the rollers 13, 14. Rollers 13, 14 can be ganged together, for example by a drive belt or the like, in order to prevent longitudinal oscillation of the tape 5 as it passes the transducer head 15.

Operation: The spring 4 which presses the pay-out winding and the take-up winding 1 against the roller 2, which rotates about a fixed axis, causes tipping torques due to its position on the lever arms 10, 11 which extend beyond the guide bearings 6, 7. These tipping torques have the axial intersection of the bearings 6, 7 and of rod 12 as their fulcrum point.

In operation, and when the drive roller 2 is rotating so that tape 5 is fed, the diameter of the take-up winding 1 will continuously increase, so that the take-up winding 1 will be pressed away from the center of rotation, that is, from the axis of the drive roller 2. The distance between the axes of the take-up winding 1 and of the drive roller 2 will increase continuously. The take-up winding 1 will, then, over the lever arm 8 tend to generate an additional tipping torque about the fulcrum of the slide bearing 6 on rod 12 which has the same direction as the tipping torque generated by the spring 4 applied to the lever arm 10. The tipping torque resulting in a frictional force between the slide bearing 6, and the guide rod or track 12 on which the slide bearing 6 is located, will thus increase and tend to increase the frictional engagement force of winding 1 on roller 2. This higher frictional force due to the tipping torque, tending to move against the laterally acting force of the increasing diameter of the take-up winding has as a result that, during operation and while the tape 5 is wound on the take-up winding, the take-up winding 1 is pressed against the drive roller 2 with a higher force than when the tape 5 is stationary.

The diameter of the pay-out winding 3 decreases during movement of the tape 5, so that the distance of the axes of rotation of the pay-out winding 3 and of the drive roller 2 continuously decreases. The pay-out winding 3 will generate a tilting or tipping force through the lever arm 9 which is opposite the tipping torque caused by the spring 4 over the lever arm 11. The frictional force of the slide bearing 7 with respect to the rod or track 12 which guides the slide bearing 7 is thus decreased as tape 5 is moved by the roller 2 in pay-out direction. This tipping torque resulting in a lower frictional force, that is, the decreased sliding effort between the bearing 7 and rod or track 12 has as a result that the pay-out winding 3 during operation and while tape 5 is reeled off, is pressed against the roller 2 with lesser force than when the tape 5 is stationary.

A superimposed sliding tilting torque force which is in increasing direction with respect to the contact forces between the take-up winding 1 and the drive roller 2 is superimposed on the force generated by the spring 4 which tends to press the take-up winding 1 against the roller 2. At the pay-out winding 3, the tilting torque force is negatively superimposed on the force generated by spring 4 which tends to decrease the force with which the pay-out winding 3 is pressed against roller 2. During operation, that is, as the diameters of the respective windings 1, 3 change continuously, the tension within the moving tape 5 is maintained.

The tension within the tape 5 will be present regardless of the direction of winding, that is, from the left winding towards the right (with respect to the FIGURE) or in the reverse direction. The forces will, likewise, be applied with respect to the direction of winding of the tape, and not with respect to the geometric location of the winding reels, so that superimposed forces will be appropriately applied to modify the force of the spring 4, regardless of the direction of movement of the tape 5. Direction of movement of tape 5 is controlled by the direction of rotation of the drive roller 2.

Various changes and modifications of the arrangement may be made; the contact force relationships necessary for proper tension of the tape 5 beneath the transducer head 15 can be obtained by differently arranged or positioned structures. For example, the respective take-up and pay-out windings can be carried by lever arms which are journalled in a rotary bearing at the ends thereof remote from the take-up and pay-out windings, with a tension spring connecting the two lever arms which presses the lever arms against a drive roller located between the respective windings. Torque forces which arise upon relative change of diameter of the respective take-up and pay-out windings, and set, for example, into the pivot bearings of the lever arms, can generate the superimposed forces opposed to, and assisting, respectively, the engagement forces due to the spring, so that the appropriate contact force relationships between the windings and the drive rollers will be maintained, as explained above in connection with the example shown in the figure.

The arrangement ensures that the pay-out winding is driven by the drive roller with a force which decreases during the operation of the system, and as the pay-out winding decreases in diameter; the force applied to the take-up winding will change correspondingly.

The mechanical losses within the winding operation of transferring the tape from the pay-out storage winding to the take-up storage winding are substantially less than in customary arrangements in which the frictional forces of the holders for the respective pay-out and take-up windings, with respect to each other and with respect to the drive roller, are not related. The efficiency of the transport device as described with respect to prior art devices is improved to such an extent that savings in power required to move the tape from the pay-out to the take-up winding between 70 to 80% could be achieved.

The tape transport system is particularly suitable for magnetic video recording and video reproduction systems, in which television signals are recorded in longitudinal tracks on parallel tracks located on a magnetic tape, and in which the tape is reversible when moved from one winding reel to another, so that the direction of tape travel through the apparatus changes when the tape has been spooled from one reel unto the other.

I claim:

1. Tape recording/reproducing transport system having
    a drive roller means (2);
    a tape take-up storage winding (1) rotatable about a take-up axis;

a tape pay-out storage winding (3) rotatable about a pay-out axis, parallel to said take-up axis, said storage windings being movably located radially adjacent the drive roller means (2) to permit movement of said axes of rotation relative to the axis of rotation of the drive roller means;

spring means (4) providing a spring force and pressing said storage windings with essentially equal force against the drive roller means, and means (6, 7, 10, 11, 12) providing an additional changeable force to the respective storage winding against the drive roller means, and comprising, in accordance with the invention, tilting torque force means (6, 7, 12) acting on both said storage winding means and, in operation, generating a friction force acting counter the force of the spring means (4) pressing the pay-out storage winding means (3) against the drive roller means (2) and further generating a friction force acting in the sense of the force exerted by the spring means (4) to increase the force of engagement of the take-up winding means (1) with the drive roller means (2).

2. System according to claim 1, wherein the tilting torque force means comprises guide means (6, 7, 12) and lever means (8, 10; 9, 11), one lever means (8, 10) being associated with said take-up storage winding (1) and another lever means (9, 11) being associated with said pay-out storage winding, said lever means maintaining said windings and defining the position of the respective axes of rotation of said windings, said lever means and said guide means having matching engagement surfaces in sliding engagement with each other;

said spring means connecting the lever means associated with respective windings and acting thereon at a position remote from said engagement surfaces to provide said engagement force between said windings and the roller means, and to further provide said changing tilting torque force as the diameter of the respective take-up and pay-out storage windings changes in operation of the system.

3. System according to claim 2, wherein said guide means comprises a guide rod or track (12);

said lever means comprises double-arm levers of equal length connected, respectively, to define the axis of the take-up storage winding and the axis of the pay-out storage winding, and having one lever arm (8, 9) at the side of said guide rod or track (12) adjacent said axes, and another lever arm (10, 11) remote therefrom, the spring means (4) being connected to the remote lever arms (10, 11) and interconnecting the same.

4. System according to claim 3, wherein said matching engagement surfaces comprise slide bearings (6, 7) connecting the respective lever arms (8, 10; 9, 11) and the guide rod or track (12).

5. Tape recording/reproducing transport system having a drive roller means (2); a take-up storage winding (1);

movable take-up lever arms (8, 10) positioning said take-up storage winding adjacent the drive roller means for frictional engagement of the circumference of the take-up storage winding therewith;

a pay-out storage winding (3);

movable pay-out lever means (9, 11) positioning said pay-out storage winding adjacent the drive roller means at the side opposite the take-up storage winding means, for frictional engagement of the circumference of the pay-out storage winding therewith, whereby, upon rotation of the drive roller means (2), the take-up lever means will move to shift the axis of rotation of the take-up storage winding away from the axis of rotation of the drive roller means, and the pay-out lever means will permit movement to shift the axis of rotation of the pay-out storage winding towards the axis of rotation of the drive roller means;

spring means (4) biasing said lever means to engage the drive roller means with the respective storage winding, and comprising, in accordance with the invention, a tilting torque force means (6, 7, 12) acting on said take-up lever arm in a direction generating a friction force adding to the force of the spring means acting on the take-up roller means and increasing the engagement force of the take-up storage winding means with the roller means, and further generating a friction force acting on the pay-out lever arm in a direction subtracting from the force of the spring means acting on the pay-out roller means to decrease the engagement force of the pay-out storage winding with the roller means, said tilting torque force means becoming effective upon shifting movement of said axes of rotation of said storage windings during operation of said system.

6. System according to claim 5, wherein said tilting torque force means comprises a fixed element (12) and sliding elements (6, 7) connected to said respective lever means and in engagement with the fixed element.

7. System according to claim 5, wherein said tilting torque means comprises a guide rod or track (12) and slide shoes (6, 7) slidable on said guide rod or track (12) and in surface sliding engagement therewith, said slide shoes being operatively coupled to and moving with said respective lever means (8, 10; 9, 11).

8. System according to claim 7, wherein said guide track or rod (12) is positioned in a line parallel to a line connecting the respective axes of rotation of said storage windings, and the respective movable lever means are of the same length.

9. System according to claim 8, wherein the respective lever means are double-arm levers, one arm (8, 10) of each lever means carrying the respective storage winding and extending from one side of said slide shoe, the other arm (10, 11) extending from the side of said slide shoe opposite the respective winding means;

and the spring means comprises a tension spring (4) connecting said other lever arms at a point remote from the guide track or rod.

* * * * *